United States Patent
Duong et al.

(10) Patent No.: US 12,018,583 B2
(45) Date of Patent: Jun. 25, 2024

(54) IMPELLER WITH HUB SWEEP

(71) Applicant: PRATT & WHITNEY CANADA CORP., Longueuil (CA)

(72) Inventors: Hien Duong, Mississauga (CA); Jason Nichols, Mississauga (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 323 days.

(21) Appl. No.: 16/692,241

(22) Filed: Nov. 22, 2019

(65) Prior Publication Data

US 2021/0156259 A1 May 27, 2021

(51) Int. Cl.
| | | |
|---|---|---|
| *F01D 5/14* | (2006.01) | |
| *F02K 3/06* | (2006.01) | |
| *F04D 29/32* | (2006.01) | |
| *F04D 29/38* | (2006.01) | |

(52) U.S. Cl.
CPC ............... *F01D 5/141* (2013.01); *F02K 3/06* (2013.01); *F04D 29/324* (2013.01); *F04D 29/384* (2013.01); *F05D 2220/36* (2013.01); *F05D 2240/303* (2013.01); *F05D 2240/304* (2013.01); *F05D 2240/307* (2013.01); *F05D 2250/70* (2013.01)

(58) Field of Classification Search
CPC ... F01D 5/12; F01D 5/141; F01D 5/14; F04D 29/28; F04D 29/284; F04D 29/286; F04D 29/324; F04D 29/384; F05D 2220/36; F05D 2240/303; F05D 2240/304; F05D 2240/307; F05D 2250/70
See application file for complete search history.

(56) References Cited

U.S. PATENT DOCUMENTS

| | | | | |
|---|---|---|---|---|
| 2,441,432 | A | * 5/1948 | McGee | .................. F04D 29/266 |
| | | | | 416/188 |
| 7,293,964 | B2 | * 11/2007 | Gummer | .................. B23P 6/002 |
| | | | | 29/889.1 |
| 9,133,849 | B2 | * 9/2015 | Sheth | ..................... F04D 29/242 |
| 10,221,858 | B2 | 3/2019 | Berenyi et al. | |
| 2008/0229742 | A1 | * 9/2008 | Renaud | ................... F04D 29/30 |
| | | | | 60/597 |

(Continued)

FOREIGN PATENT DOCUMENTS

| | | |
|---|---|---|
| EP | 2022988 | 2/2009 |
| EP | 2620651 | 7/2013 |
| EP | 3364042 | 8/2018 |

OTHER PUBLICATIONS

European Search Report for Application No. 20209243.3 dated Mar. 29, 2021.

*Primary Examiner* — Sang K Kim
(74) *Attorney, Agent, or Firm* — NORTON ROSE FULBRIGHT CANADA LLP

(57) ABSTRACT

An impeller having a hub, blades extending from the hub along respective spans from roots to tips, the blades extending along respective chords from leading edges to trailing edges, the leading edge of at least one of the blades having a cutback section defining a sweep at the root, the cutback section extending in a spanwise direction from the hub to a location at least about 5% of the span from the hub of the at least one of the blades, and the cutback section extending in a chordwise direction along at least about 5% of the chord of the at least one of the blades.

17 Claims, 6 Drawing Sheets

(56) References Cited

U.S. PATENT DOCUMENTS

| | | | |
|---|---|---|---|
| 2012/0263599 A1* | 10/2012 | Sugimura | F04D 29/30 |
| | | | 416/223 A |
| 2016/0245297 A1* | 8/2016 | Husted | F04D 29/668 |
| 2016/0252100 A1 | 9/2016 | Lentz | |
| 2016/0319833 A1 | 11/2016 | Rubino et al. | |
| 2021/0062821 A1* | 3/2021 | Yagi | F04D 29/284 |

* cited by examiner

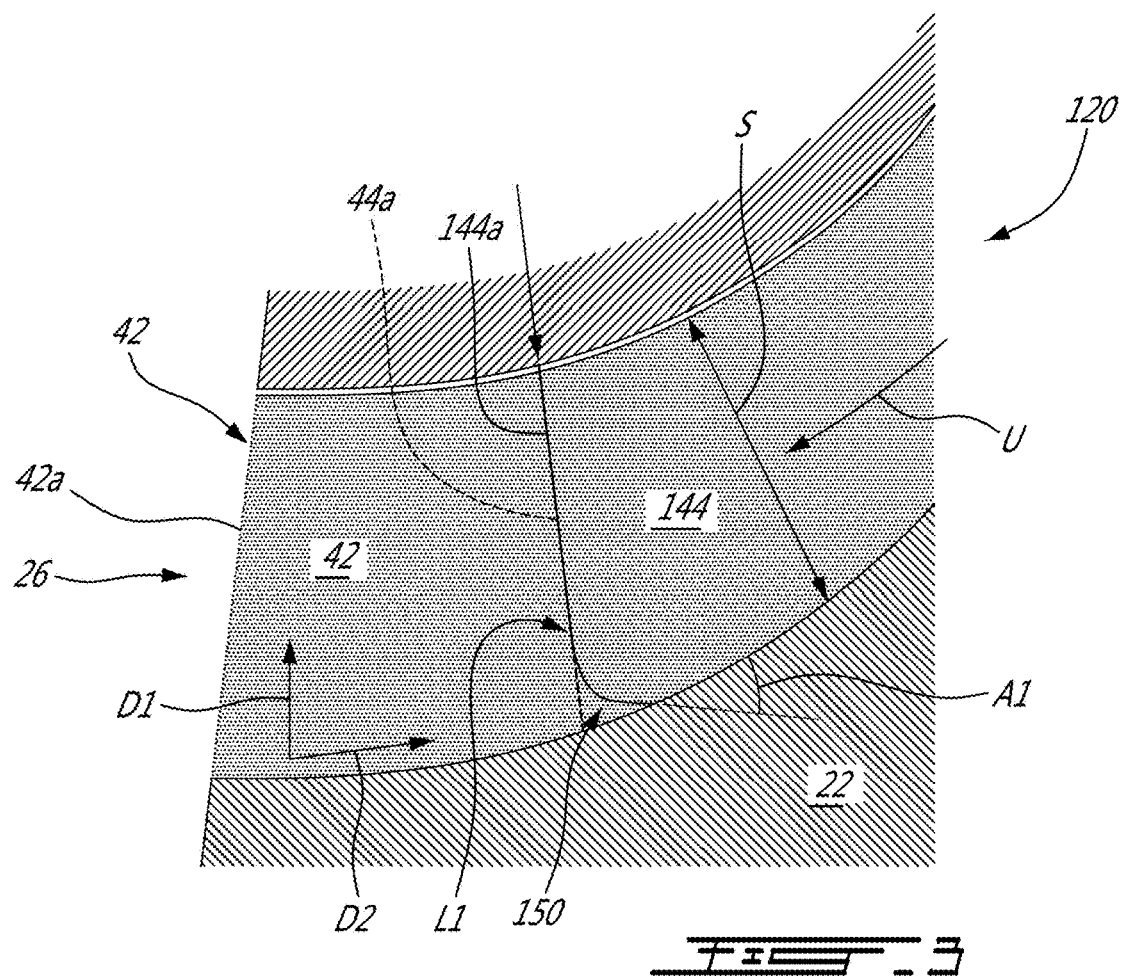
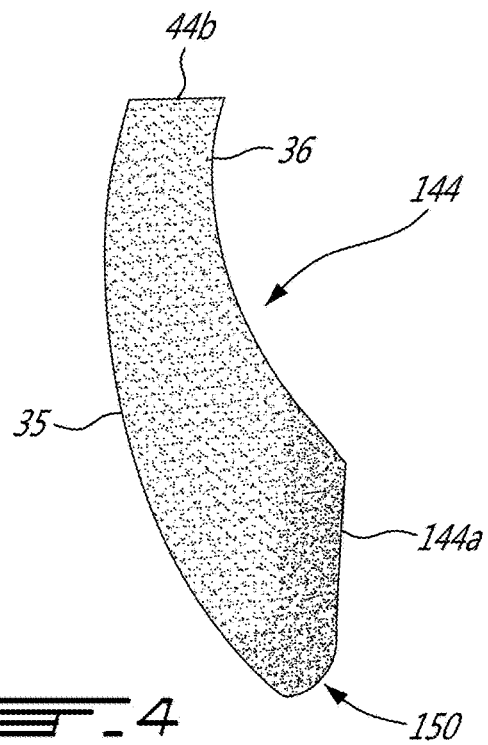

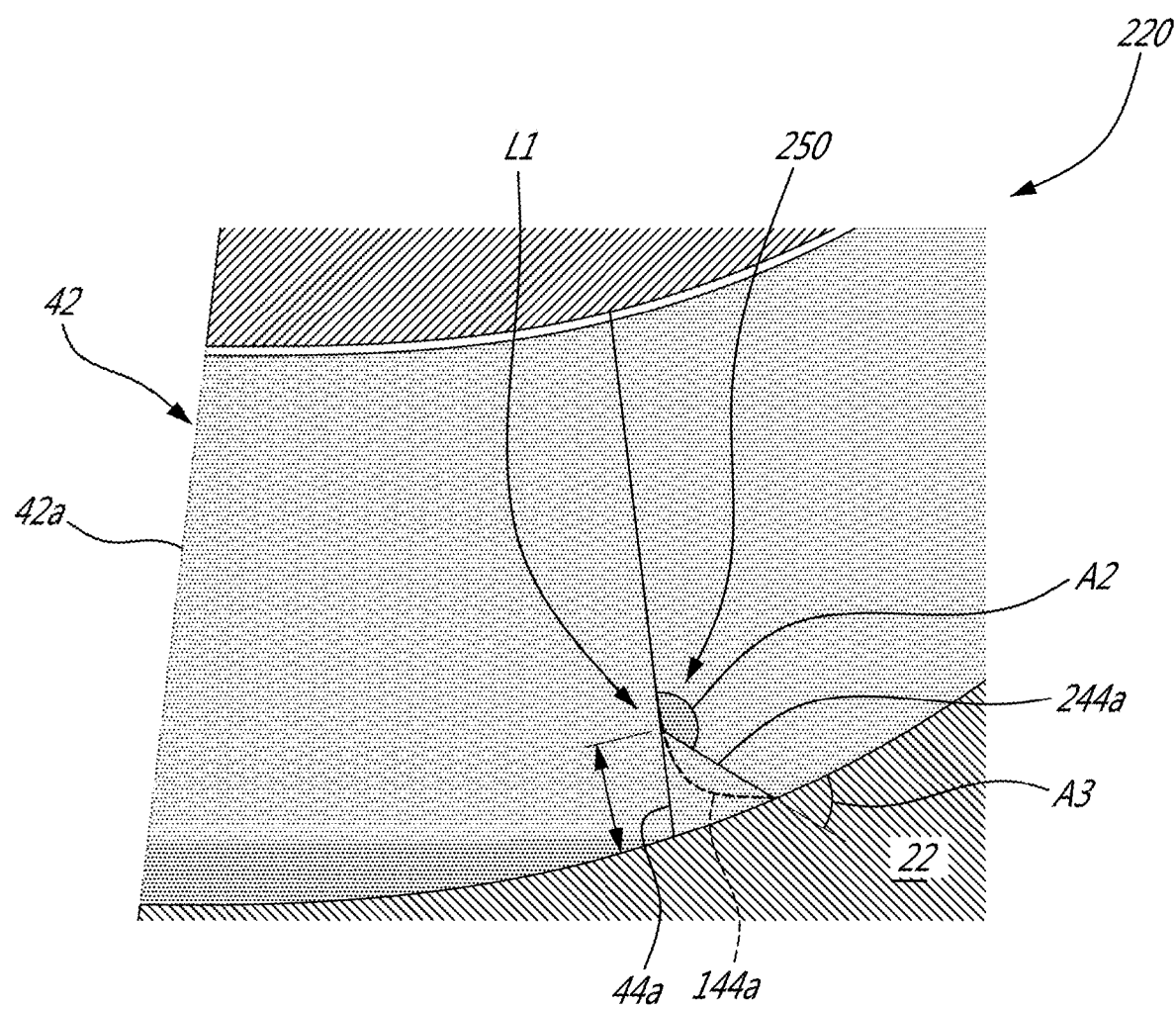

IMPELLER WITH HUB SWEEP

TECHNICAL FIELD

The application relates generally to gas turbine engines and, more particularly, to centrifugal compressors used in such engines.

BACKGROUND

Impellers may be used as radial rotors in centrifugal compressors, such as those which are used in gas turbine engines. An impeller has a hub and blades disposed therearound. When the impeller rotates about its rotational axis, a secondary flow that includes three-dimensional vortical flow structures develops in blade passages due to the rotation of the flow and to the non-uniform inlet pressure profiles. While main flow is responsible for extracting or providing the energy to the working fluid, the secondary flow, which is transverse to the main flow, can reduce energy available for transfer to the working fluid. Such secondary flow creates flows that go from pressure side to suction side of the blades of the impeller, can contribute to tip leakage flow and to pre-mature flow blockage in the impeller. These effects of secondary flow are thus undesirable.

SUMMARY

In one aspect, there is provided an impeller comprising a hub, blades extending from the hub along respective spans from roots to tips, the blades extending along respective chords from leading edges to trailing edges, the leading edge of at least one of the blades having a cutback section defining a sweep at the root, the cutback section extending in a spanwise direction from the hub to a location at least about 5% of the span from the hub of the at least one of the blades, and the cutback section extending in a chordwise direction along at least about 5% of the chord of the at least one of the blades.

In another aspect, there is provided an impeller comprising a hub, blades extending from the hub along respective spans from roots to tips, the blades extending along respective chords from leading edges to trailing edges, the leading edge of at least one of the blades extending in an upstream direction, relative to a flow of air circulating between the blades, and away from the hub to a location corresponding to at least about 5% of the span of the at least one of the blades, the leading edge of the at least one of the blades at the hub being offset from the leading edge of the at least one of the blades at the location by a distance in a chordwise direction of at least about 5% of the chord of the at least one of the blades.

In yet another aspect, there is provided an impeller for a centrifugal compressor comprising a hub, blades extending from the hub along respective spans from roots to tips, the blades extending along respective chords from leading edges to trailing edges, the leading edge of at least one of the blades having a means for decreasing a secondary flow.

In yet another aspect, there is provided an impeller comprising a hub, blades extending from the hub along respective spans from roots to tips, the blades extending along respective chords from leading edges to trailing edges, the leading edge of at least one of the blades having a cutback section defining a sweep at the root, the cutback section extending in a spanwise direction from the hub to a location being at least about 10% of the span of the at least one of the blades from the hub, the chord of the at least one of the blades at the hub less than about 95% of the chord of the at least one of the blades at the location.

BRIEF DESCRIPTION OF THE DRAWINGS

Reference is now made to the accompanying figures in which:

FIG. 3 is a schematic cross-sectional fragmented view taken on a plane disposed between blades of an impeller in accordance with one embodiment;

FIG. 4 is a schematic three dimensional view of one of the blades of the impeller of FIG. 3;

FIG. 5 is a schematic cross-sectional fragmented view taken on a plane disposed between blades of an impeller in accordance with another embodiment;

DETAILED DESCRIPTION

Figure 1:
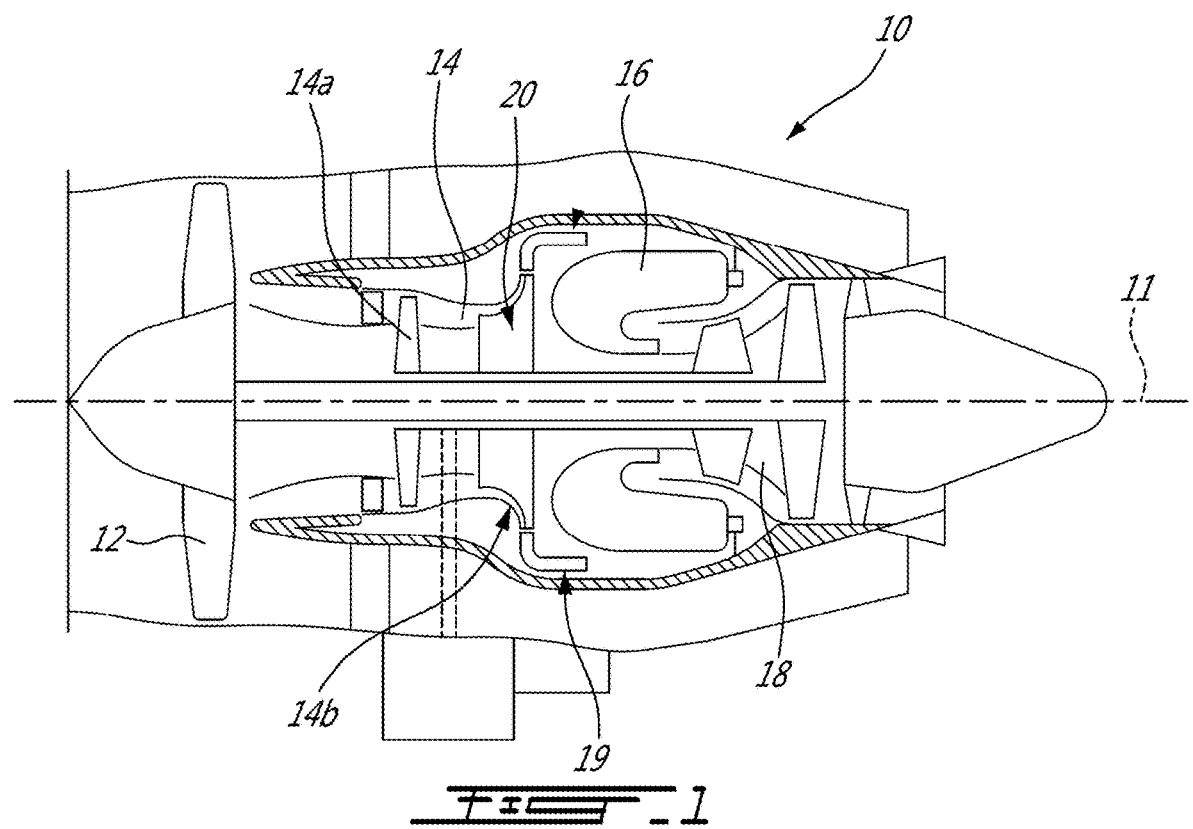
FIG. 1 is a schematic cross sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are configured for rotation about a longitudinal axis 11 of the gas turbine engine 10.

In the embodiment shown, the compressor section 14 includes a low-pressure compressor 14a and a high-pressure compressor 14b located downstream of the low-pressure compressor 14a. In the depicted embodiment, the high-pressure compressor 14b includes a centrifugal compressor having an impeller 20 rotating within a shroud. The high-pressure compressor 14b further includes a diffuser case assembly having diffuser conduits 19 located downstream of an outlet of the impeller 20. The diffuser conduits 19 are used to further increase the pressure of the air circulating therethrough and to redirect the air from a substantially radial direction to a substantially axial direction relative to the central axis 11 of the gas turbine engine 10.

Figure 2:
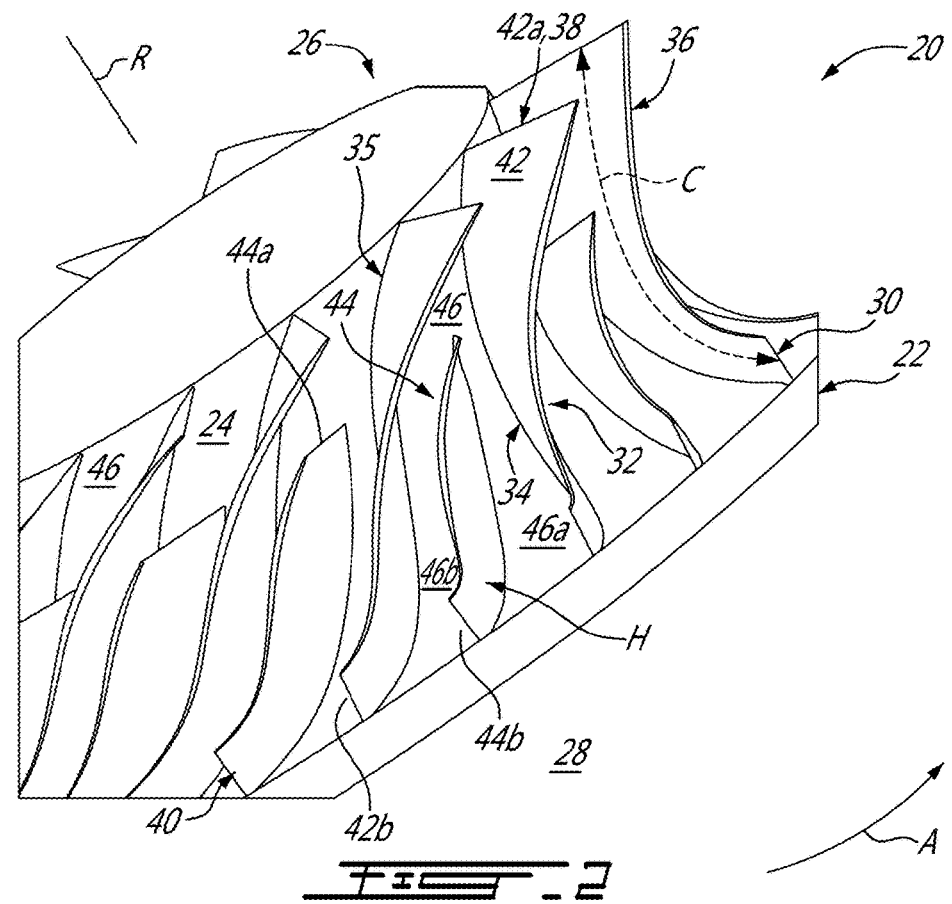
FIG. 2 is a schematic three dimensional fragmented view of a baseline impeller of a compressor of the gas turbine engine of FIG. 1.

Referring now to FIG. 2, the impeller 20 is configured for rotation about a rotational axis R, which, in the embodiment shown, is coincident with the engine longitudinal axis 11. The impeller 20 has a hub 22 having an axial-to-radial shape. Stated otherwise, in use, a flow of working fluid circulates substantially tangentially to a surface 24 of the hub 22. The flow, in an upstream location 26 of the impeller 20, is aligned substantially axially relative to the axis R and, in a downstream location 28, is aligned substantially radially relative to the axis R. In other words, the flow circulates generally parallel to the axis R when entering the impeller 20 and generally perpendicularly to the axis R, and away therefrom, when exiting the impeller 20. If the impeller 20 is used as a turbine impeller instead of a compressor impeller, this arrangement is opposite.

The impeller 20 further includes blades 30 disposed on the hub 22. The blades 30 have pressure sides 32 and suction sides 34. The pressure and suction sides 32 and 34 extend on opposite sides of the blades from roots 35, at the hub 22, toward tips 36 of the blades 30 and from leading edges 38 toward trailing edges 40 of the blades 30. The blade leading and trailing edges 38 and 40 are spaced apart from one another by chords C. The hub 22 and the tips of the blades 36 are spaced apart from one another by spans S (FIG. 3). The blades 30 extend along their spans S from their roots 35 to their tips 36.

In the embodiment shown, the spans S of the blades 30 may vary between the leadings edge 38 and the trailing edge 40. The span S of the blades 30 may decrease from the leading edges 38 to the trailing edges 40. The chords C of the blades 30 may vary between the roots 35 of the blades 30 to their tips 36.

In the embodiment shown, the blades 30 include full blades 42 and splitter blades 44 circumferentially disposed in alternation around the rotational axis R. Stated otherwise, in an embodiment, one of the splitter blades 44 may be disposed between each set of adjacent two of the full blades 42. Chords of the splitter blades 44 are less than chords of the full blades 42. In the illustrated embodiment, the chords of the splitter blades 44 range between 50% to 80% of the chords of the full blades 42. The main and splitter blades 42, 44 have respecting leading edges 42a, 44a and trailing edges 42b, 44b. In the embodiment shown, the trailing edges 40 of the main and splitter blades 42, 44 may be aligned whereas their leading edges 38 may be offset. The leading edges 38 of the splitter blades 44 may be located downstream of the leading edges 38 of the main blades 42.

The impeller 20 has a flow channel 46 between each adjacent two of the full blades 42. The flow channels 46 are configured for receiving an incoming flow at the upstream location 26 and for outletting the flow at the downstream location 28. Along the flow channels 46, the flow changes direction from generally axially, and parallel to the rotational axis R, to generally radially, and perpendicular to the rotational axis R. A width of each of the flow channels 46 varies from the upstream 26 to the downstream 28 locations. For any given position along the rotational axis R between the upstream 26 and downstream 28 locations, the height of each of the flow channels 46 may be constant in a radial direction from the hub 22 toward the blade tips 36. The width varies along the axis R. The width of each of the flow channels 46 may increase from the upstream 26 to the downstream 28 locations.

The blade leading edges 38 may be circumferentially offset from the blade trailing edges 40. Consequently, the flow circulating within the flow channels 46 may move around the rotational axis R from the upstream location 26 to the downstream location 28. In the case of a compressor impeller, this rotation allows the impeller to transfer energy to the working fluid. Alternatively, in the case of a turbine impeller, this rotation allows the impeller to extract energy from the working fluid.

In the embodiment shown, each of the flow channels 46 is divided in two downstream of the upstream location 26 by the splitter blades 44. Hence, the flow channels 46 each diverge into a first flow channel 46a and a second flow channel 46b. The first flow channel 46a is bounded by a suction side 34 of one of the full blade 42, a pressure side 32 of an adjacent one of the splitter blades 44 and by the hub 22. The second flow channel 46b is bounded by a suction side 34 of the adjacent one of the splitter blades 44, by a pressure side 32 of an adjacent one of the full blade 42, and by the hub 22.

In some circumstances, secondary flow, generally referred to as three-dimensional vortical flow structures, develops in the first and second flow channels 46a and 46b due to flow turning and non-uniform inlet pressure profiles. While main flow is responsible for energy extraction/transfer, the secondary flow is transverse to the main flow and acts to reduce energy available for energy extraction/transfer. The secondary flow originates in a boundary layer that flows along the blades 30 and contains a span-wise velocity gradient. When boundary flow is turned, traverse velocity components are introduced.

In some cases, the secondary flow creates cross flows that go from the blade pressure sides 32 to the blade suction sides 34. These flows are carried off the adjacent suction side 34 from the hub 22 to the tips 36 due to pressure difference and centrifugal force. The secondary flow interacts with main blade tip clearance flow. This interaction may result in mixing loss and flow blockage. The combination of leakage and secondary flow is observed to reach the entire passage and may create large flow blockage. Large flow blockage may lead to premature impeller inducer stalling, or affect performance of downstream components.

Due to the nature of low aspect ratio of the blades 130, there may be strong secondary flow within the impeller passage 46. The cross flow from the pressure side travels up the suction side to the tip section where it may interact with the tip leakage flow. This may result in high impeller mixing loss and flow non uniformity into the downstream diffuser conduits 19 (FIG. 1). The non-uniform flow may be detrimental to diffuser performance.

Referring now to FIGS. 3-4, an impeller in accordance with another embodiment is generally shown at 120. In the embodiment shown, each of the splitter blades 144 has a cutback section 150. The cutback section 150 may be created by rounding a corner defined by an intersection of the leading edge 144a of the splitter blade 144 with the hub 22. In other words, the splitter hub leading corner point is swept back and a curve is formed that may be tangent to both the leading edge and splitter airfoil hub section.

The cutback section 150 creates a sweep of the splitter blade 144 at the hub 22. Stated differently, the leading edge 144a of the splitter blade 144 extends in an upstream direction as it extends away from the hub. Stated otherwise, the leading edge 144a of the splitter blade 144 at the hub may be located downstream of the leading edge 144a at a mid-span location relative to a flow circulating between the blades. In other words, a sweep angle A1 between the leading edge 144a of the splitter blade 144 and the hub 22 may range from about 5 to about 70 degrees, preferably 20 degrees. The sweep angle A1 may be different than 90 degrees. The leading edges 144a of the splitter blades 144 may extend in an upstream direction U as the leading edges 144a extends away from the hub 22 of the impeller 120. The upstream direction U is taken relative to a flow circulating within the flow passages 46 defined between the blades 30 of the impeller 120.

The cutback section 150 extends both in a spanwise direction D1 and in a chordwise direction D2. The spanwise direction D1 extends from the roots to the tips whereas the chordwise direction extends from the leading edges to the trailing edges. The cutback section 150 may extend along the spanwise direction D1 from the hub 22 to a location L1. The location L1 may be at least at about 5% of the span S of the splitter blades 144 from the hub 22. The location L1 may be at least at about 10% of the span of the splitter blades 144 from the hub 22. The location L1 may be at least at about 5% of the span S of the splitter blades 144; the span S taken at the leading edges 144a of the splitter blades 144. The location L1 may be at least at about 15% of the span of the splitter blades 144 from the hub 22; the span S taken at the leading edges 144a of the splitter blades 144. In a particular embodiment, the cutback section 150 extends from the hub to at most 30% of the span S.

In the depicted embodiment, the cutback section 150 extends in the chordwise direction D2 along at least about 5% of the chord C of the splitter blades 144. The cutback section 150 may extend in the chordwise direction D2 along at least 5% of the chord C of the splitter blades 144; the chord C taken at the location L1. The leading edges 144a of the splitter blades 144 at the hub 22 may be offset from the leading edges 144a at the location L1 by a distance in the chordwise direction D2 of at least about 5% of the chord C of the splitter blades 144. In a particular embodiment, the cut-back section 150 extends along at most 20% of the chord C of the splitter blades 144. chordwise As shown in FIGS. 3-4, the leading edge 144a of the splitter blade 144 is curved at the cutback section 150. A chord of the splitter blade 144 may vary non-linearly with a spanwise position along the cutback section 150. Any suitable shape for the cutback section 150 may be used, such as circular and parabolic. A radius of the leading edge 144a of the splitter blade 144 may range from 5% to 30% of the span S. In the embodiment shown, the cutback section 150 is tangential to a remainder of the splitter blade 144. In other words, the cutback section 150 of the leading edge 144a of the splitter blade 144 mergers tangentially to a remainder of the leading edge 144a of the splitter blade 144 at the location L1.

In a particular embodiment, the chord C of the splitter blade 144 between the hub 22 and the location L1 may be less than that of the splitter blade 44 of the baseline impeller 20 described above with reference to FIG. 2. For the sake of comparison, the leading edge 44a of the splitter blade 44 of the baseline impeller 20 of FIG. 2 is shown in FIG. 3 with a dashed line. In a particular embodiment, the chord C of the splitter blade 144 at the hub 22 is less than about 95% of the chord C of the splitter blade 144 at the location L1. Stated differently, the cutback section 150 may be defined by a decrease in the chord C of the splitter blade 144 of a least 5% along a distance spanning from the location L1 to the hub 22.

Referring now to FIG. 5, another embodiment of an impeller is generally shown at 220. For the sake of conciseness, only elements that differ from the impeller 120 described herein above with reference to FIG. 3 are described herein below.

In the embodiment shown, the cutback section 250 is straight. In other words, a chord C of the splitter blade 244 may vary linearly with a spanwise position along the cutback section 250. In the embodiment shown, the cutback section 250 is angled relative to a remainder of the splitter blade 244. An angle A2 is defined by the leading edge 244a at the location L1. The angle A3 defined by the leading edge 244a and the hub 22 may range from about 5 degrees to about 70 degrees. A height of the cutback section 250 may range from about 5% to about 30% of the span S at the leading edge 244a of the splitter blades 244.

Although the cutback sections 150, 250 have been described as being defined by the splitter blades, the cutback sections may alternatively, or in combination, be defined by the main blades 42. It is understood that the cutback sections 150, 250 may be defined by one or more of the splitter blades and/or by one or more of the main blades. All of the splitter blades and/or all of the main blades may define cutback sections.

In a particular embodiment, the cutback sections 150, 250 are connected to the hub 22 of the impeller 120, 220 via fillets. The size of the cutback may be increased to accommodate the fillet. If a fillet is present, a radius of the fillet may be added to the span of the leading edge of the splitter blades. In other words, the dimensions of the cutback sections may be calculated with an effective span, the effective span corresponding to the span of the leading edge plus the radius of the fillet.

Figure 6:
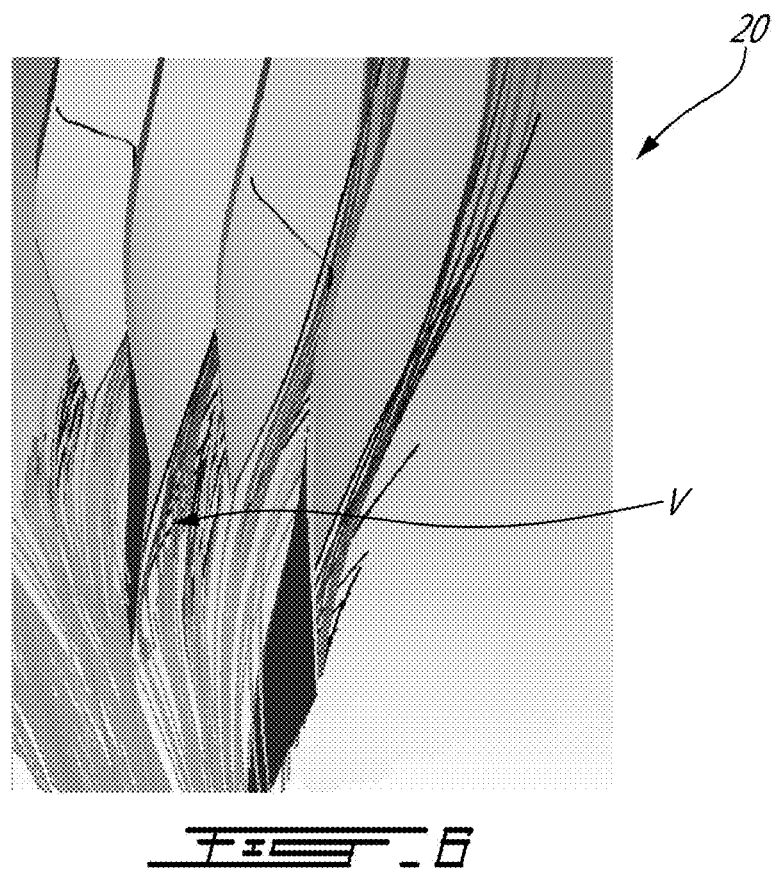
FIG. 6 illustrates three dimensional streamlines on the baseline impeller of FIG. 2.
Figure 7:
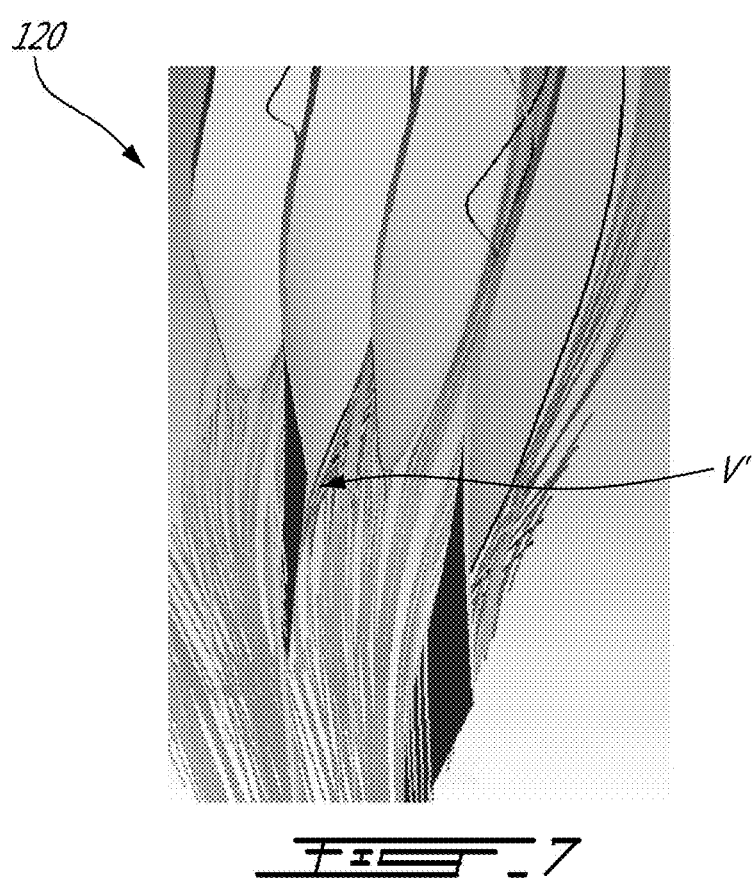
FIG. 7 illustrates three dimensional streamlines on the impeller of FIG. 3.

Referring now to FIGS. 6-7, streamlines of flows circulating between the blades of the baseline impeller 20 of FIG. 2 and between the blades of the impeller 120 of FIG. 3 are shown. As illustrated in FIG. 6, cross flow travels from the pressure side of the main blade 42, across the flow passage, toward the suction side of the main blade. As this secondary flow crosses into the main passage, it may roll up into vortices V and may be swept downstream by the main flow.

As shown in FIG. 7, vortex V' is smaller and the vortices that may be present are of a lesser magnitude than those in FIG. 6. Moving the leading edge of the splitter blade back may allow some leakage flow ahead of the leading edge to go from the pressure side to suction side of the blade. This leakage flow may help to counter some of the cross flow coming from the pressure side of the main blades and may redirect it in the flow direction. The result may reduce cross secondary flow. A comparison of FIGS. 6 and 7 show that there is a reduction in cross flow caused by the cutback sections 150, 250.

The disclosed impellers 120, 220 described above with reference to FIG. 3 may minimize impeller secondary flow by sweeping the leading edge near the hub in the direction of flow of either the main or splitter blade. The cutback sections 150, 250 may reduce cross flow. A reduction in this flow may result in less interaction with the splitter tip leakage and may prevent more flow reaching the pressure side of the main blade. The combined effects may produce even less tip clearance roll up on main blade tip.

Figure 8:
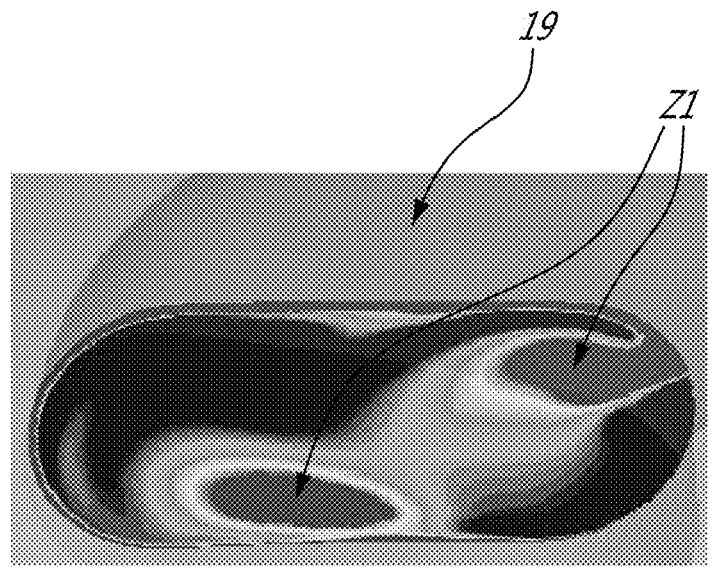
FIG. 8 shows velocity contours on a cross-section of a diffuser conduit of a diffuser of the compressor of the gas turbine engine of FIG. 1 using the baseline impeller of FIG. 2.
Figure 9:
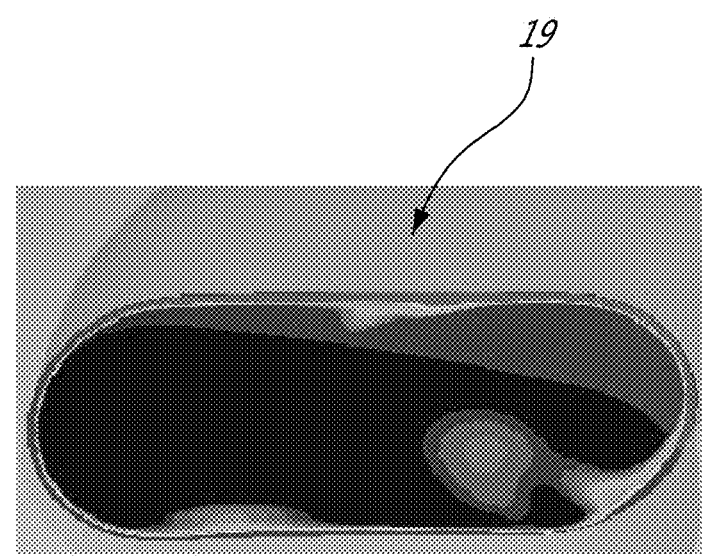
FIG. 9 shows velocity contours on a cross-section of the diffuser conduit of the diffuser of the compressor of the gas turbine of FIG. 1 using the impeller of FIG. 3.

Referring now to FIGS. 8-9, velocity contours are shown on a cross-section of one of the diffuser conduits 19 of the high-pressure compressor 14b (FIG. 1) with identical scales. As illustrated on FIG. 8, two zones Z1 of low velocities are presented when using the baseline impeller 20 described above with reference to FIG. 2. As illustrated in FIG. 9, the velocity field is more uniform when using the impeller 120, 220 described above with reference to FIGS. 3 and 5, which define cutback sections 150, 250. Moreover, performance improvement may be achieved toward the stall side for the cutback sections, which may indicate additional benefit for surge margin or better engine performance for a constant surge margin.

Figure 10:
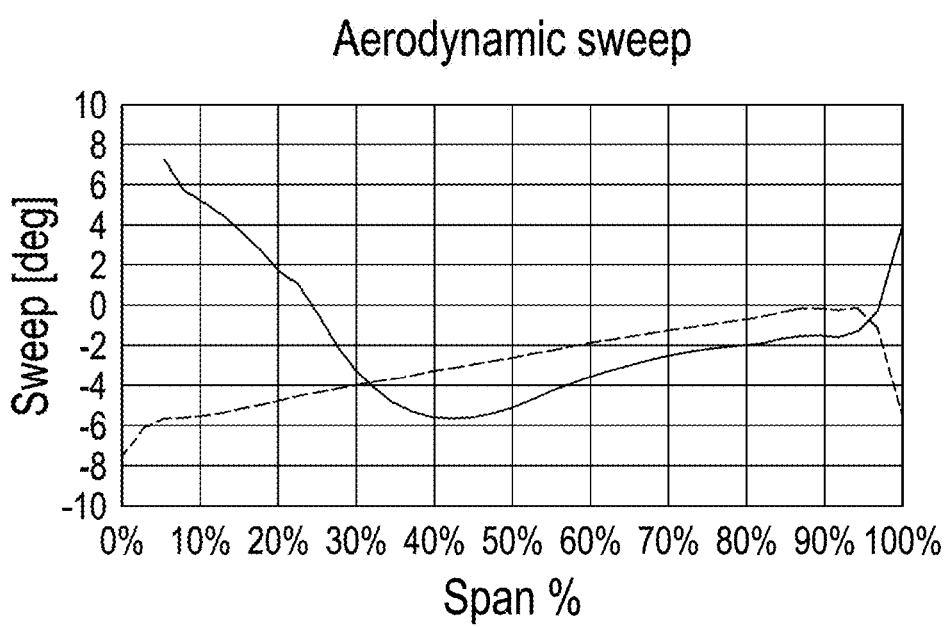
FIG. 10 is a graph illustrating a variation of an aerodynamic sweep angle in function of a span for the blades of the impeller of FIG. 2 (dashed line) and for the blades of the impeller of FIG. 3 (solid line).

Referring now to FIG. 10, a graph illustrates a variation of the aerodynamic sweep angle in function of a spanwise position for the leading edge 44a of the splitter blade 44 of the baseline impeller 20 of FIG. 2 (dashed line) and for the leading edge 144a of the splitter blade 144 of the impeller 120 of FIG. 3 (solid line). The aerodynamic sweep angle of the leading edge 144a of the splitter blade 144 is greater than that of the leading edge 44a of the splitter blade 44a of the baseline impeller at least at the cutback section 150. The aerodynamic sweep angle is defined as an angle between the leading edge of the blade and a direction of an incoming flow. In the embodiment shown, the aerodynamic sweep angle of the leading edge 144a of the splitter blade 144 is at least about 5 degrees, preferably at least about 10 degrees, greater than the aerodynamic sweep angle of the leading edge 144a at 30% of the span S from the hub 22; the span S being taken at the leading edge 144a.

Still referring to FIG. 10, the aerodynamic sweep angle difference between the splitter blade 44 of the baseline impeller 20 and the splitter blade 144 of the impeller 120 occurs between 0% and 30% of the span S. The difference in aerodynamic sweep angle may be greater than the difference in sweep angle between the baseline splitter blade 44 and the modified splitter blade 144. This may indicate strong flow redistribution in radial direction due to the cutback.

In a particular embodiment, the blade may be cutback and a beta angle of the blade may be changed to maintain an original sweep distribution (e.g., before the cutback). The beta angle is the blade angle when viewed from top down. Zero degree is the engine centerline and 90 degrees is perpendicular to the engine centerline. By controlling the beta angle distribution, one may define the blade turning or blade shape.

Embodiments disclosed herein include:

A. An impeller comprising a hub, blades extending from the hub along respective spans from roots to tips, the blades extending along respective chords from leading edges to trailing edges, the leading edge of at least one of the blades having a cutback section defining a sweep at the root, the cutback section extending in a spanwise direction from the hub to a location at least about 5% of the span from the hub of the at least one of the blades, and the cutback section extending in a chordwise direction along at least about 5% of the chord of the at least one of the blades.

B. An impeller comprising a hub, blades extending from the hub along respective spans from roots to tips, the blades extending along respective chords from leading edges to trailing edges, the leading edge of at least one of the blades extending in an upstream direction, relative to a flow of air circulating between the blades, and away from the hub to a location corresponding to at least about 5% of the span of the at least one of the blades, the leading edge of the at least one of the blades at the hub being offset from the leading edge of the at least one of the blades at the location by a distance in a chordwise direction of at least about 5% of the chord of the at least one of the blades.

C. An impeller comprising a hub, blades extending from the hub along respective spans from roots to tips, the blades extending along respective chords from leading edges to trailing edges, the leading edge of at least one of the blades having a mean for decreasing a secondary flow.

D. An impeller comprising a hub, blades extending from the hub along respective spans from roots to tips, the blades extending along respective chords from leading edges to trailing edges, the leading edge of at least one of the blades having a cutback section defining a sweep at the root, the cutback section extending in a spanwise direction from the hub to a location being at least about 10% of the span of the at least one of the blades from the hub, the chord of the at least one of the blades at the hub less than about 95% of the chord of the at least one of the blades at the location.

Embodiments A, B, C, and D may include any of the following elements, in any combinations:

Element 1: the cutback section extends in the chordwise direction along at least 5% of the chord of the at least one of the blades at the location. Element 2: the cutback section extends in the chordwise direction along at most 20% of the chord of the at least one of the blades. Element 3: the location is at most at about 30% of the span of the at least one of the blades from the hub. Element 4: the location is at least at about 10% of the span of the at least one of the blades at the leading edge of the at least one of the blades. Element 5: the blades include main blades and splitter blades, each of the splitter blades disposed between two adjacent ones of the main blades, the splitter blades having chord lengths less than that of the main blades, the cutback section defined in leading edges of each of the splitter blades. Element 6: the blades include main blades and splitter blades, each of the splitter blades disposed between two adjacent ones of the main blades, the splitter blades having chord lengths less than that of the main blades, the cutback section defined by leading edges of each of the main blades. Element 7: a sweep angle of the at least one of the blades at the hub ranges from 5 to 70 degrees. Element 8: the sweep angle is about 20 degrees. Element 9: the leading edge of the at least one of the blades is curved at the cutback section. Element 10: the mean is a cutback extending in a spanwise direction from the hub to a location being at least about 5% of the span of the at least one of the blades from the hub and at most 30% of the span from the hub. Element 11: the cutback extends in a chordwise direction along at least 5% of the chord of the at least one of the blades and along at most 20% of the chord.

In the present disclosure including claims, the expression "about" implies that a given value may range from plus or minus 10% of the given value. For instance, a value of about 10 implies that the value may range from 9 to 11.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An impeller comprising a hub, blades extending from the hub along respective spans from roots to tips, the blades extending along respective chords from leading edges to trailing edges, the blades including main blades and splitter blades interspaced between the main blades, the splitter blades having chord lengths less than that of the main blades, the leading edge of at least one of the splitter blades having a cutback section defining a sweep at the root, the cutback section extending in a spanwise direction from the hub to a location at least about 5% of the span from the hub of the at least one of the splitter blades, and the cutback section extending in a chordwise direction along at least about 5% of the chord of the at least one of the splitter blades, a downstream most location of the cutback section, relative to a flow of air circulating between the blades, located at the hub, the leading edge of the at least one of the splitter blades is curved at the cutback section, a radius of the leading edge of the splitter blade at the cutback section ranging from 5% to 30% of the span.

2. The impeller of claim 1, wherein the cutback section extends in the chordwise direction along at least 5% of the chord of the at least one of the splitter blades at the location.

3. The impeller of claim 1, wherein the cutback section extends in the chordwise direction along at most 20% of the chord of the at least one of the splitter blades.

4. The impeller of claim 1, wherein the location is at most at about 30% of the span of the at least one of the splitter blades from the hub.

5. The impeller of claim 1, wherein the location is at least at about 10% of the span of the at least one of the splitter blades at the leading edge of the at least one of the splitter blades.

6. The impeller of claim 1, wherein the cutback section is defined in leading edges of each of the splitter blades.

7. The impeller of claim 1, wherein the leading edges of each of the main blades define a second cutback section.

8. The impeller of claim 1, wherein a sweep angle of the at least one of the splitter blades at the hub ranges from 5 to 70 degrees, the sweep angle corresponding to an angle between the hub at an intersection with the leading edge and the leading edge at the intersection.

9. The impeller of claim 8, wherein the sweep angle is about 20 degrees.

10. The impeller of claim 1, wherein a remainder of the leading edge of the at least one of the splitter blades and the curved section are tangent to one another at the location.

11. An impeller comprising a hub, blades extending from the hub along respective spans from roots to tips, the blades extending along respective chords from leading edges to trailing edges, the leading edge of at least one of the blades extending in an upstream direction, relative to a flow of air circulating between the blades, and away from the hub to a location corresponding to at least about 5% of the span of the at least one of the blades, the location being at most at about 30% of the span of the at least one of the blades from the hub, the leading edge of the at least one of the blades at the hub being offset from the leading edge of the at least one of the blades at the location by a distance in a chordwise direction of at least about 5% of the chord of the at least one of the blades, the location being upstream of an intersection between the leading edge and the hub, the leading edge of the at least one of the blades having a curved section that extends from the hub to the location, the curved section being tangent to a remainder of the leading edge at the location.

12. The impeller of claim 11, wherein the distance is at least 5% of the chord of the at least one of the blades at the location.

13. The impeller of claim 11, wherein a cutback section extends in the chordwise direction along at most 20% of the chord of the at least one of the blades.

14. The impeller of claim 11, wherein the location is at least at about 10% of the span of the at least one of the blades at the leading edge of the at least one of the blades.

15. The impeller of claim 11, wherein the blades include main blades and splitter blades, each of the splitter blades disposed between two adjacent ones of the main blades, the splitter blades having chord lengths less than that of the main blades, the at least one of the blades including each of the splitter blades.

16. The impeller of claim 11, wherein the blades include main blades and splitter blades, each of the splitter blades disposed between two adjacent ones of the main blades, the splitter blades having chord lengths less than that of the main blades, the at least one of the blades including each of the main blades.

17. The impeller of claim 11, wherein a sweep angle of the at least one of the blades at the hub ranges from 5 to 70 degrees, the sweep angle corresponding to an angle between the hub at an intersection with the leading edge and the leading edge at the intersection.

\* \* \* \* \*